(12) United States Patent
Chao et al.

(10) Patent No.: US 11,280,641 B2
(45) Date of Patent: Mar. 22, 2022

(54) POSITION-ENCODING DEVICE AND METHOD

(71) Applicant: Industrial Technology Research Institute, Hsinchu (TW)

(72) Inventors: Chang-Po Chao, Taipei (TW); Wen-Yu Chen, Hemei Township, Changhua County (TW); Tsai-Kan Chien, Dounan Township, Yunlin County (TW); Sih-Han Li, New Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 533 days.

(21) Appl. No.: 16/426,203

(22) Filed: May 30, 2019

(65) Prior Publication Data

US 2020/0182657 A1  Jun. 11, 2020

(30) Foreign Application Priority Data

Dec. 7, 2018 (TW) ................................ 107144055

(51) Int. Cl.
*G01D 5/244* (2006.01)

(52) U.S. Cl.
CPC ....... *G01D 5/2448* (2013.01); *G01D 5/24476* (2013.01)

(58) Field of Classification Search
CPC .................... G01D 5/2448; G01D 5/24476
(Continued)

(56) References Cited

U.S. PATENT DOCUMENTS

| 4,587,579 A | 5/1986 | Cocke et al. |
| 7,250,881 B2 | 7/2007 | Kiriyama et al. |

(Continued)

FOREIGN PATENT DOCUMENTS

| CN | 1769844 A | 5/2006 |
| CN | 101213423 A | 7/2008 |

(Continued)

OTHER PUBLICATIONS

Chinese language office action dated Jun. 21, 2021, issued in application No. CN 201811526399.1.
(Continued)

*Primary Examiner* — Aditya S Bhat
(74) *Attorney, Agent, or Firm* — McClure, Qualey & Rodack, LLP (57) ABSTRACT

A position-encoding device includes a sensing device, a filtering device, a calibrating device and a compensating device. The sensing device senses the motion of a moving device to generate first and second signals. The filtering device filters the first and second signals to generate first and second filtering signal. The calibrating device captures the first and second filtering signals to obtain time and phase information of the first and second filtering signals, performs gain and offset calibration on the first and second filtering signals, and performs a phase calibration on the first and second filtering signals through first, second feedback signals and the time and phase information of the first and second filtering signals to generate first and second calibrating signals. The compensating device compensates for the first and second calibrating signals according to a lookup table, so as to generate first and second position encoding signals.

16 Claims, 9 Drawing Sheets

(58) Field of Classification Search
USPC .......................................................... 702/150
See application file for complete search history.

(56) References Cited

U.S. PATENT DOCUMENTS

| | | | |
|---|---|---|---|
| 7,385,887 | B2 | 6/2008 | Hiratsuka |
| 7,933,373 | B2 | 4/2011 | Kishibe et al. |
| 7,936,222 | B2 | 5/2011 | Wang |
| 8,710,827 | B2 | 4/2014 | Zhitomirsky |
| 8,860,478 | B2 | 10/2014 | Chen et al. |
| 9,231,562 | B2 | 1/2016 | Tinker |
| 9,231,602 | B1 | 1/2016 | Banin et al. |
| 9,548,746 | B2 | 1/2017 | Wicpalek et al. |
| 10,690,526 | B2 | 6/2020 | Park et al. |
| 2016/0169717 | A1 | 6/2016 | Zhitomirsky |
| 2016/0202088 | A1 | 7/2016 | Kishimoto |
| 2017/0317633 | A1* | 11/2017 | Li .................... H02K 11/225 |
| 2020/0153410 | A1* | 5/2020 | Nielsen ................ H03H 9/542 |

FOREIGN PATENT DOCUMENTS

| | | |
|---|---|---|
| CN | 101345886 A | 1/2009 |
| CN | 105450385 A | 3/2016 |
| CN | 105492870 A | 4/2016 |
| CN | 105987710 A | 10/2016 |
| TW | I278649 B | 4/2007 |
| TW | I298488 B | 7/2008 |
| TW | I373919 B | 10/2012 |
| TW | I492545 B | 7/2015 |
| TW | I587634 B | 6/2017 |
| WO | 2007/116254 A1 | 10/2007 |
| WO | 2010/138155 A3 | 1/2012 |

OTHER PUBLICATIONS

Ye, S., et al.; "A Multiple-Crystal Interface PLL With VCO Realignment to Reduce Phase Noise;" IEEE Journal of Solid-State Circuits; vol. 37; No. 12; Dec. 2002; pp. 1795-1803.

Farjad-Rad, R., et al.; "A Low-Power Multiplying DLL for Low-Jitter Multi GHz Clock Generation in Highly Integrated Digital Chips;" IEEE Journal of Solid-State Circuits; vol. 37; No. 12; Dec. 2002; pp. 1804-1812.

Olsson, T., et al.; "A Digitally Controlled PLL for SoC Applications;" IEEE Journal of Solid-State Circuits; vol. 39; No. 5; May 2004; pp. 751-760.

Van Hoang, H., et al.; "An Efficient Approach to Correct the Signals and Generate High-Resolution Quadrature Pulses for Magnetic Encoders;" IEEE Transactions on Industrial Electronics; vol. 58; No. 8; Aug. 2011; pp. 3634-3646.

Tan, K.K., et al.; "New Interpolation Method for Quadrature Encoder Signals;" IEEE Transactions on Instrumentation and Measurement; vol. 51; No. 5; Oct. 2002; pp. 1073-1079.

* cited by examiner

POSITION-ENCODING DEVICE AND METHOD

CROSS-REFERENCE TO RELATED APPLICATION

This application is based on, and claims priority from, Taiwan Application Serial Number 107144055, filed Dec. 7, 2018, the disclosure of which is hereby incorporated by reference herein in its entirety.

TECHNICAL FIELD

The disclosure relates to a position-encoding device and method.

BACKGROUND

In general, an industrial tool machine is equipped with a sensing encoder having a positioning function for positioning the industrial tool machine. Since the sensing encoder is affected by some factors (such as a delay generated in a process or in a signal conversion), the signal generated by the sensing encoder may have errors, thereby affect the positioning accuracy of the industrial tool machine.

In order to improve the accuracy of a signal generated by the sensing encoder, the current practice subtracts two crossover points of the sine (sin) wave and the cosine (cos) wave generated by the sensing encoder to determine the distance of a phase-lead or phase-lag between two signals and then performs a corresponding process of phase calibration. However, performing a calibration in this manner, the signal generated by the sensing encoder will still have errors. Therefore, how to effectively improve the accuracy of the signal generated by the sensing encoder have become important issues to be improved by various manufacturers.

SUMMARY

The disclosure provides a position-encoding device, which includes a sensing device, a filtering device, a calibrating device and a compensating device. The sensing device senses the motion of a moving device to generate a first signal and a second signal. The filtering device filters the first signal and the second signal to generate a first filtering signal and a second filtering signal. The calibrating device captures the first filtering signal and the second filtering signal to obtain time and phase information of the first filtering signal and the second filtering signal. The calibrating device performs a gain and offset calibration on the first filtering signal and the second filtering signal. The calibrating device performs a phase calibration on the first filtering signal and the second filtering signal through a first feedback signal, a second feedback signal and the time and phase information of the first filtering signal and the second filtering signal to generate a first calibrating signal and a second calibrating signal. The first calibrating signal is designated as the first feedback signal and the second calibrating signal is designated as the second feedback signal. The compensating device includes a lookup table and compensates for the first calibrating signal and the second calibrating signal according to the lookup table, so as to generate a first position encoding signal and a second position encoding signal.

Another embodiment of the disclosure provides a position encoding method, which includes the following steps. The motion of a moving device is sensed to generate a first signal and a second signal. The first signal and the second signal are filtered to generate a first filtering signal and a second filtering signal. The first filtering signal and the second filtering signal are captured to obtain time and phase information of the first filtering signal and the second filtering signal. A gain and offset calibration is performed on the first filtering signal and the second filtering signal. A phase calibration is performed on the first filtering signal and the second filtering signal through a first feedback signal, a second feedback signal and the time and phase information of the first filtering signal and the second filtering signal to generate a first calibrating signal and a second calibrating signal. The first calibrating signal is designated as the first feedback signal and the second calibrating signal is designated as the second feedback signal. The first calibrating signal and the second calibrating signal are compensated according to a lookup table, so as to generate a first position encoding signal and a second position encoding signal.

BRIEF DESCRIPTION OF DRAWINGS

The disclosure can be more fully understood by reading the subsequent detailed description and examples with references made to the accompanying drawings, wherein.

DETAILED DESCRIPTION OF DISCLOSED EMBODIMENTS

Technical terms of the disclosure are based on general definitions in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or similar element or component.

Figure 1:
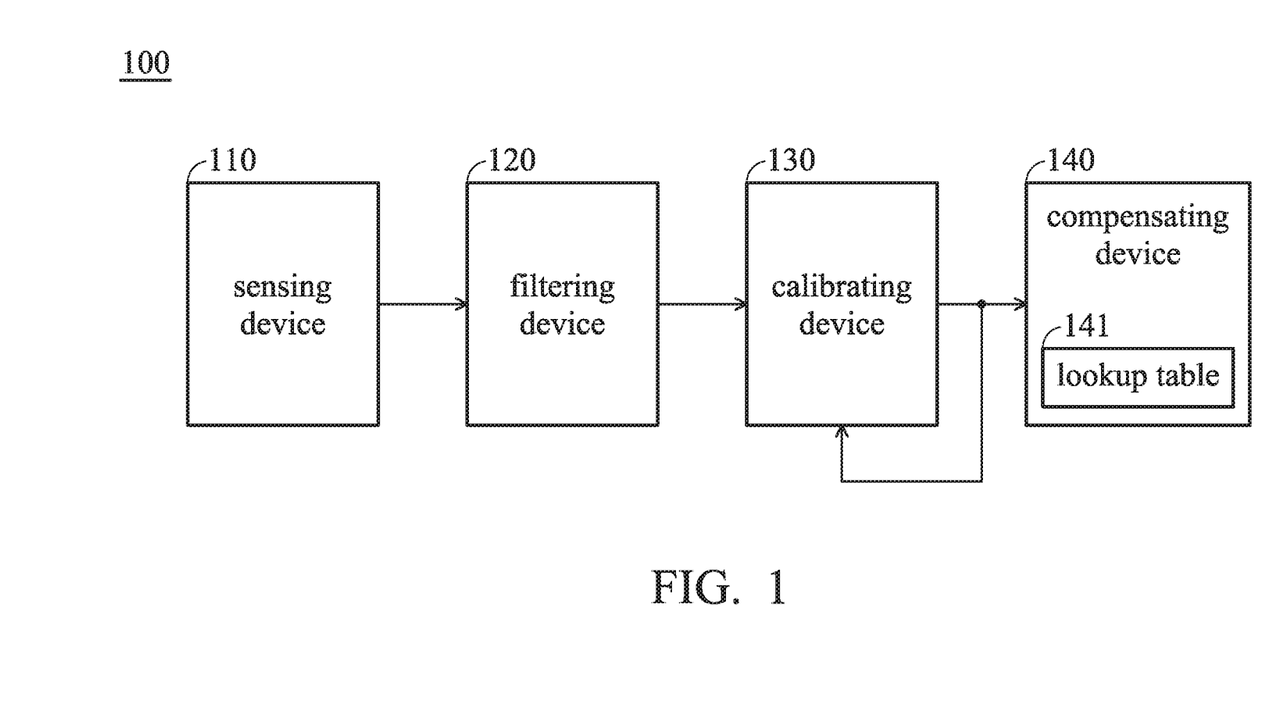
FIG. 1 shows a schematic view of a position-encoding device according to an embodiment of the disclosure.

FIG. 1 shows a schematic view of a position-encoding device according to an embodiment of the disclosure. Please refer to FIG. 1, the position-encoding device 100 includes a sensing device 110, a filtering device 120, a calibrating device 130 and compensating device 140.

The sensing device 110 senses the motion of a moving device to generate a first signal and a second signal. The first signal and the second signal are, for example, digital signals, and the phase difference between the first signal and the second signal is 90 degrees. In the embodiment, the moving device is, for example, a machine with linear slide rail or other industrial tool machines. In addition, the sensing device 110 is, for example, a magnetic sensor, a magnetoresisitve (MR) sensor, or other sensors for sensing the motion of the moving device.

The filtering device 120 is coupled to the sensing device 110, receives the first signal and the second signal and filters the first signal and the second signal to generate a first filtering signal and a second filtering signal. In the embodiment, the filtering device 120 is, for example, a decimator filter. That is, the filtering device 120 may effectively filter noises of the first signal and the second signal generated by the sensing device 110 (i.e. an input terminal).

The calibrating device 130 is coupled to the filtering device 120, receives the first filtering signal and the second filtering signal, and the calibrating device 130 captures the first filtering signal and the second filtering signal to obtain time and phase information of the first filtering signal. Furthermore, the calibrating device 130 further captures waveforms of initial N cycles of the first filtering signal and the second filtering signal to obtain the time and phase information of the first filtering signal and the second filtering signal, wherein N is a positive integer greater than 1. Furthermore, 5≤N≤30. That is, when the moving device starts to work and motion, the calibrating device 130 captures the waveforms of initial N cycles of the first filtering signal and the second filtering signal to obtain the time and phase information of the first filtering signal and the second filtering signal corresponding to the N cycles. The time and phase information is a basis for subsequently performing a phase calibration on the first filtering signal and the second filtering signal.

Then, the calibration device 130 may perform a gain and offset calibration on the first filtering signal and the second filtering signal. For example, the calibration device 130 uses a gain adjustment manner to calibrate magnitudes of the first filtering signal and the second filtering signal to a digital value of, for example, 2048. In addition, the calibration device 130 uses an offset adjustment manner to calibrate offsets of the first filtering signal and the second filtering signal to zero and calibrate average values of magnitudes of the first filtering and the second filtering signal to a digital value of, for example, 1024.

Afterward, the calibration device 130 performs a phase calibration on the first filtering signal and the second filtering signal according to a first feedback signal, a second feedback signal and the above time and phase information of the first filtering signal and the second filtering signal, so as to generate a first calibrating signal and a second calibrating signal. In the embodiment, the first calibrating signal is designated as the first feedback signal and the second calibrating signal is designated as the second feedback signal.

That is, the calibration device 130 may include a phase-lock loop (not shown). Accordingly, by the operation of the phase-lock loop, the calibration device 130 may designate the first calibrating signal as the first feedback signal and designate the second calibrating signal as the second feedback signal. Then, the calibration device 130 performs the phase calibration on the first filtering signal and the second filtering signal according to the first feedback signal, the second feedback signal and the time and phase information of the first filtering signal and the second filtering signal, so as to generate the first calibrating signal and the second calibrating signal. For example, the time and phase information of the first filtering signal and the second filtering signal also corresponds to the N cycles. Therefore, the phase noises and the phase errors of the first filtering signal and the second filtering signal may be effectively reduced. The first calibrating signal and the second calibrating signal generated by the calibrating device 130 do not affected by the phase noises and the phase errors.

The compensating device 140 includes a lookup table 141. The compensating device 140 is coupled to the calibrating device 130, receives the first calibrating signal and the second calibrating signal and compensates for the first calibrating signal and the second calibrating signal according to the lookup table 141, so as to generate a first position encoding signal and a second position encoding signal. That is, when the compensating device 140 receives the first calibrating signal and the second calibrating signal, the compensating device 140 may search a corresponding relationship of the first calibrating signal and the second calibrating signal in the lookup table 141, so as to compensates for the first calibrating signal and the second calibrating signal. Therefore, the accuracy of shifting and positioning and a data processing speed may be effectively improved. In the embodiment, the lookup table 141 can be obtained by the rule of thumb.

Figure 2:
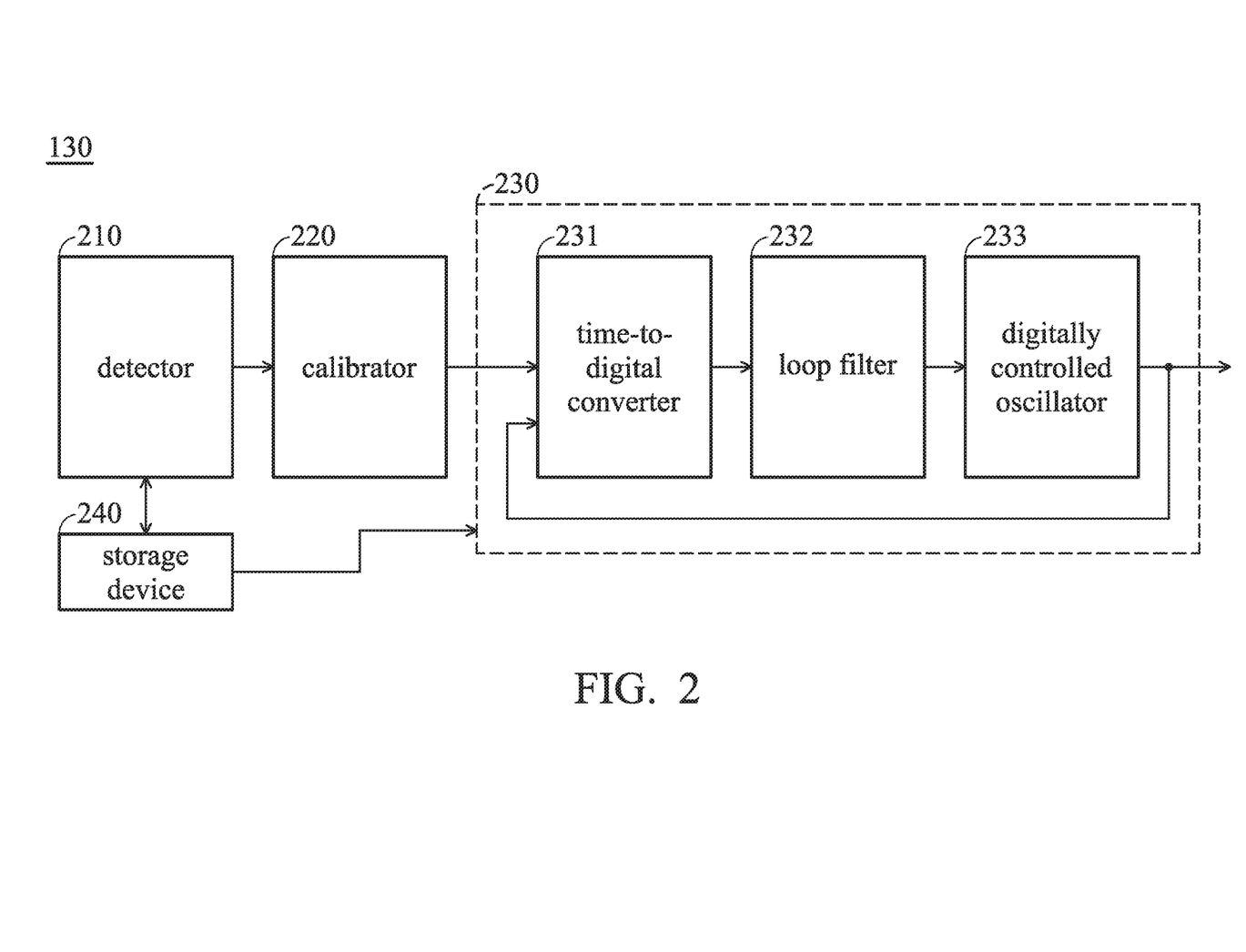
FIG. 2 shows a detailed schematic view of the calibration device in FIG. 1.

FIG. 2 shows a detailed schematic view of the calibration device in FIG. 1. Please refer to FIG. 2, the calibrating device 130 includes a detector 210, a calibrator 220 and a digital phase-lock loop 230.

The detector 210 captures the first filtering signal and the second filtering signal to obtain the time and phase information of the first filtering signal and the second filtering signal. For example, the detector 210 captures waveforms of initial N cycles of the first filtering signal and the second filtering signal to obtain the time and phase information of the first filtering signal and the second filtering signal corresponding to the N cycles. That is, when the moving device starts to work and motion, the detector 210 may capture the first filtering signal and the second filtering signal to obtain the time and phase information of the first filtering signal and the second filtering signal. In other words, when the moving device starts to work and motion, the detector 210 may capture waveforms of the initial N cycles of the first filtering signal and the second filtering signal to obtain the time and phase information of the first filtering signal and the second filtering signal corresponding to the N cycles.

The calibrator 220 performs the gain and offset calibration on the first filtering signal and the second filtering signal. For example, the calibrator 220 uses the gain adjustment manner to calibrate magnitudes of the first filtering signal and the second filtering signal to a digital value of, for example, 2048. In addition, the calibrator 220 uses the offset adjustment manner to calibrate offsets of the first filtering signal and the second filtering signal to zero and calibrate average values of magnitudes of the first filtering and the second filtering signal to a digital value of, for example, 1024.

The digital phase-lock loop 230 performs the phase calibration on the first filtering signal and the second filtering signal through the first feedback signal, the second feedback signal and the time and phase information of the first filtering signal and the second filtering signal, so as to generate the first calibrating signal and the second calibrating signal. For example, the digital phase-lock loop 230 performs the phase calibration on the first filtering signal and the second filtering signal through the first feedback signal, the second feedback signal and the time and phase information of the first filtering signal and the second filtering signal corresponding to the N cycle. Accordingly, the digital phase-lock loop 230 generates the first calibrating signal and the second calibrating signal. That is, the digital phase-lock loop 230 designates the first calibrating signal as the first feedback signal. The digital phase-lock loop 230 designates the second calibrating signal as the second feedback signal. The digital phase-lock loop 230 transmits the first feedback signal and the second feedback signal to an input terminal of the digital phase-lock loop 230. Then, the digital phase-lock loop 230 performs the phase calibration on the first filtering signal and the second filtering signal according to the first feedback signal, the second feedback signal and the time and phase information of the first filtering signal and the second filtering signal. In other words, the digital phase-lock loop 230 performs the phase calibration on the first filtering signal and the second filtering signal according to the first feedback signal, the second feedback signal and the time and phase information of the first filtering signal and the second filtering signal corresponding to the N cycles). Therefore, the phase noises and the phase errors of the first filtering signal and the second filtering signal may be effectively reduced, such that the first calibrating signal and the second calibrating signal generated by the digital phase-lock loop 230 can not affected by the phase noises and the phase errors.

Furthermore, the phase-lock loop 230 includes a time-to-digital converter 231, a loop filter 232 and digitally controlled oscillator 233.

The time-to-digital converter (TDC) 231 receives the first feedback signal, a second feedback signal and the time and phase information of the first filtering signal and the second filtering signal to generate a first output signal and a second output signal. That is, the time-to-digital converter 231 compares times and phases of the first filtering signal with the times and phases of the first feedback signal and times and phases of the second filtering signal with times and phases of the feedback signal, so as to correspondingly generate the first output signal and the second output signal.

The loop filter 232 is coupled to the time-to-digital converter 231 and filters the first output signal and the second output signal. In the embodiment, the loop filter 232 is, for example, a low pass filter, and the loop filter 232 is used to filter high-frequency parts and noises of the first output signal and the second output signal.

The digitally controlled oscillator (DCO) 233 is coupled to the loop filter 232 and the time-to-digital converter 231, and receives the first output signal and the second output signal filtered, so as to generate the first calibrating signal and the second calibrating signal. In the embodiment, the first calibrating signal is designated as the first feedback signal and the second calibrating signal is designated as the second feedback signal.

In the operation of the digital phase-lock loop 230, the time-to-digital converter 231 may compare the times and the phases of the first filtering signal with the times and the phases of the first feedback signal. At the same time, the time-to-digital converter 231 may also compare the times and the phases of the second filtering signal with the times and the phases of the second feedback signal. Accordingly, the time-to-digital converter 231 generates the first output signal and the second output signal. Then, the loop filter 232 generates the first output signal and the second output signal filtered, so as to control the times and the phases of the first calibrating signal and the second calibrating signal generated by the digitally controlled oscillator 233. Afterward, the first calibrating signal and the second calibrating signal are respectively designated as the first feedback signal and the second feedback signal. The first feedback signal and the second feedback signal are transmitted to the time-to-digital converter 231 until the difference of the times and the phases between the first output signal and the first feedback signal is the same and the difference of the times and the phases between the second output signal and the second feedback signal is the same. Therefore, the phase noises and the phase errors of the signals may be reduced.

Furthermore, the calibrating device 130 further includes a storage device 240. The storage device 240 stores the time and phase information of the first filtering signal and the second filtering signal. In other words, the storage device 240 stores the time and phase information of the first filtering signal and the second filtering signal corresponding to the N cycles. That is, when the detector 210 obtains the time and phase information of the first filtering signal and the second filtering signal, the detector 210 may store the time and phase information of the first filtering signal and the second filtering signal in the storage device 240. In other words, when the detector 210 obtains the time and phase information of the first filtering signal and the second filtering signal corresponding to the N cycles, the detector 210 may store the time and phase information of the first filtering signal and the second filtering signal corresponding to the N cycles in the storage device 240. Then, the digital phase-lock loop 230 may obtain the time and phase information of the first filtering signal and the second filtering signal in the storage device 240. In other words, the digital phase-lock loop 230 may obtain the time and phase information of the first filtering signal and the second filtering signal corresponding to the N cycles in the storage device 240 Accordingly, the digital phase-lock loop 230 performs the phase calibration on the first filtering signal and the second filtering signal.

In addition, the storage device 240 is also coupled to the digital phase-lock loop 230, and the storage device 240 provides the time and phase information of the first filtering signal and the second filtering signal to the digital phase-lock loop 230. In other words, the storage device 240 provides the time and phase information of the first filtering signal and the second filtering signal corresponding to the N cycles. Accordingly, the digital phase-lock loop 230 performs the phase calibration on the first filtering signal and the second filtering signal. In the embodiment, the storage device 240 is, for example, a memory, a register, etc.

In FIG. 2, the storage device 240 and the detector are separated from each other, but not intended to limit the disclosure. The storage device 240 is also integrated in the detector 210, and the same effect may still be achieved.

Figure 3A:
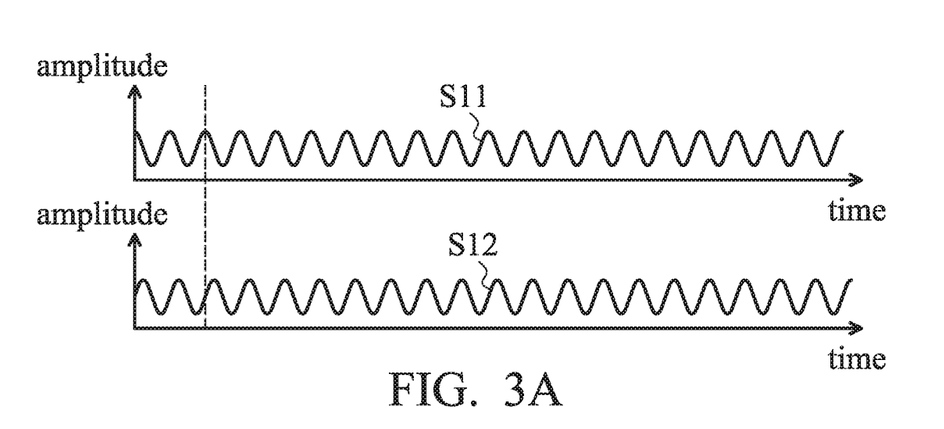
FIG. 3A shows a waveform diagram of the first filtering signal and the second filtering signal generated by the filtering device in FIG. 1.

FIG. 3A shows a waveform diagram of the first filtering signal and the second filtering signal generated by the filtering device in FIG. 1. In FIG. 3A, a curve S11 indicates the first filtering signal and a curve S12 indicates the second filtering signal. It is showed FIG. 3A, waveforms of the curve S11 and the curve S12 show that the noises of the input terminal are already eliminated.

Figure 3B:
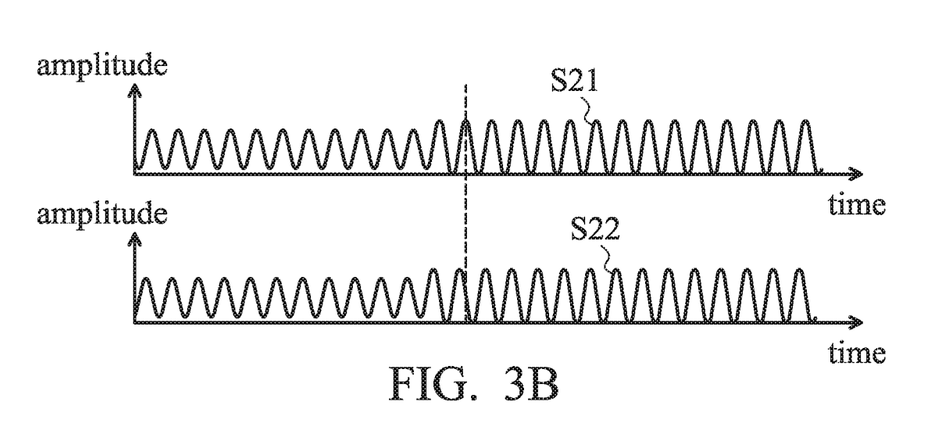
FIG. 3B shows a waveform diagram of a gain and offset calibration performed on the first filtering signal and the second filtering signal through the calibrator in FIG. 2.

FIG. 3B shows a waveform diagram of a gain and offset calibration performed on the first filtering signal and the second filtering signal through the calibrator in FIG. 2. In FIG. 3B, a curve S21 indicates the first filtering signal after performing the gain and offset calibration and a curve S22 indicates the second filtering signal after performing the gain and offset calibration. It can be seen from FIG. 3B, after the gain and offset calibration of the first filtering signal and the second filtering signal (i.e., after the dotted line in FIG. 3B), the gains and the offsets of the waveforms of the curve S21 and the curve are calibrated to an ideal value.

Figure 3C:
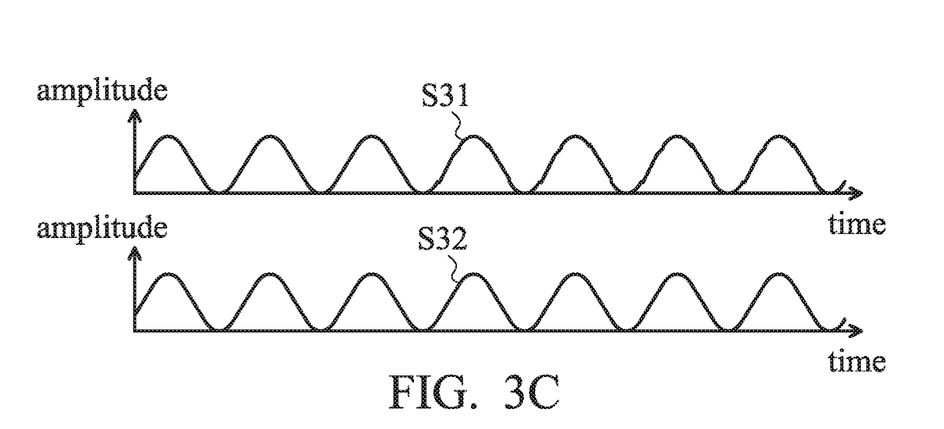
FIG. 3C shows a waveform diagram of a calibrating signal of a traditional calibration method and a first calibrating signal generated by the digital phase-lock loop in FIG. 2.

FIG. 3C shows a waveform diagram of a calibrating signal of a traditional calibration method and a first calibrating signal generated by the digital phase-lock loop in FIG. 2. In FIG. 3C, a curve S31 indicates a calibrating signal of the traditional calibration method and a curve S32 indicates the first calibrating signal generated by the digital phase-lock loop in FIG. 2. It can be seen from FIG. 3C, the waveform of the curve S31 of the traditional calibration method is not smooth, i.e., the calibrating signal of the traditional calibration method still has the phase error. On the contrary, the waveform of the curve S32 of the embodiment is smooth, and it is apparent that the waveform of the curve S32 is close to the ideal waveform. That is, the first calibrating signal already reduces the effect of the phase error and the accuracy of shifting and positioning is improved.

Figure 4:
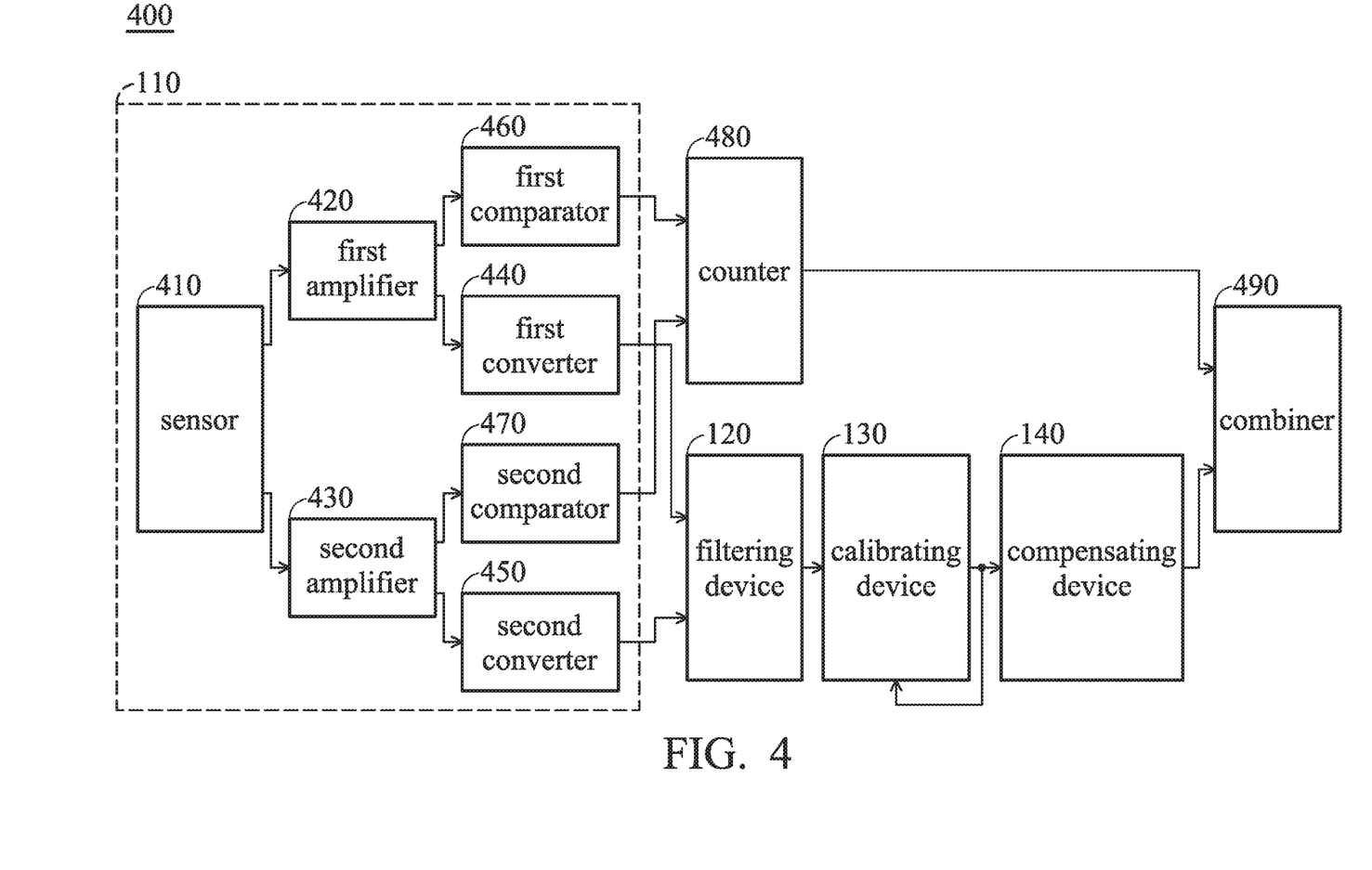
FIG. 4 shows a schematic view of a position-encoding device according to another embodiment of the disclosure.

FIG. 4 shows a schematic view of a position-encoding device according to another embodiment of the disclosure. The position-encoding device 400 includes a sensing device 110, a filtering device 120, a calibration device 130, a compensating device 140, a counter 480 and a combiner 490. In the embodiment, the filtering device 120, the calibration device 130 and the compensating device 140 are the same as or similar to the filtering device 120, the calibration device 130 and the compensating device 140 in FIG. 1. The above devices may refer to the description of the embodiment in FIG. 1, and the description thereof is not repeated here.

In addition, the internal circuit, the coupling relationship and operation of the calibration device 130 are the same as or similar to that of the calibration device in FIG. 2. The calibration device 130 of the embodiment may refer to the description of the embodiment in FIG. 2, and the description thereof is not repeated here.

The sensing device 100 includes a sensor 410, a first amplifier 420, a second amplifier 430, a first converter 440, a second converter 450, a first comparator 460 and a second comparator 470.

The sensor 410 senses the motion of the moving device to generate a first sinusoidal signal and a second sinusoidal signal, wherein the phase difference between the first sinusoidal signal and the second sinusoidal signal is 90 degrees. In the embodiment, the first sinusoidal signal is, for example, sine (sin) wave and the second sinusoidal signal is, for example, cosine (cos) wave. The sensor 410 is, for example, a magnetic sensing element or other types of sensing elements.

The first amplifier 420 is coupled to the sensor 410, receives the first sinusoidal signal and amplifies the first sinusoidal signal to generate a first amplifying signal. The second amplifier 430 is coupled to the sensor 410, receives the second sinusoidal signal and amplifies the second sinusoidal signal to generate a second amplifying signal.

The first converter 440 is coupled to the first amplifier 420, receives the first amplifying signal and converts the first amplifying signal to the first signal. The second converter 450 is coupled to the second amplifier 430, receives the second amplifying signal and converts the second amplifying signal to the second signal. In the embodiment, the first converter 440 and the second converter 450 are respectively analog-to-digital converters (ADCs) for converting the first amplifying signal with analog form and the second amplifying signal with analog form to the first signal and the second signal.

The first comparator 460 is coupled to the first amplifier 420 and receives the first amplifying signal to generate a first pulse wave signal. In the embodiment, when the first comparator 460 receives the first amplifying signal, the first comparator 460, for example, compares the first amplifying signal with a predetermined value to generate the first pulse wave signal. For example, when the first amplifying signal is greater than the predetermined value, the first comparator 460 generates a signal with high logic level. When the first amplifying signal is less than the predetermined value, the first comparator 460 generates a signal with low logic level. Therefore, the first comparator 460 may output the first pulse wave signal in the form of a pulse wave.

The second comparator 470 is coupled to the second amplifier 430 and receives the second amplifying signal to generate a second pulse wave signal. In the embodiment, when the second comparator 470 receives the second amplifying signal, the second comparator 470, for example, compares the second amplifying signal with a predetermined value to generate the second pulse wave signal. For example, when the second amplifying signal is greater than the predetermined value, the second comparator 470 generates a signal with high logic level. When the second amplifying signal is less than the predetermined value, the second comparator 470 generates a signal with low logic level. Therefore, the second comparator 470 may output the first pulse wave signal in the form of a pulse wave.

The counter 480 is coupled to the first comparator 460 and the second comparator 470 and receives the first pulse wave signal and the second pulse wave signal to generate a first counting signal and a second counting signal. The combiner 490 is coupled to the counter 480 and the compensating device 140 and receives the first counting signal, the second counting signal, the first position encoding signal and the second position encoding signal to generate a first positioning signal and a second positioning signal.

In the embodiment, the first counting signal and the second counting signal are, for example, high-speed motion signals. The first position encoding signal and the second position encoding signal are, for example, low-speed positioning signals. That is, the first positioning signal corresponds to the first counting signal and the second counting signal and can be regarded as a coarse adjustment signal. The second positioning signal corresponds to the first position encoding signal and the second position encoding signal and can be regarded as a fine adjustment signal. Therefore, through the position-encoding device 400 of the embodiment, the effect of the phase error may be effectively reduced and the accuracy of shifting and positioning is improved.

Figure 5:
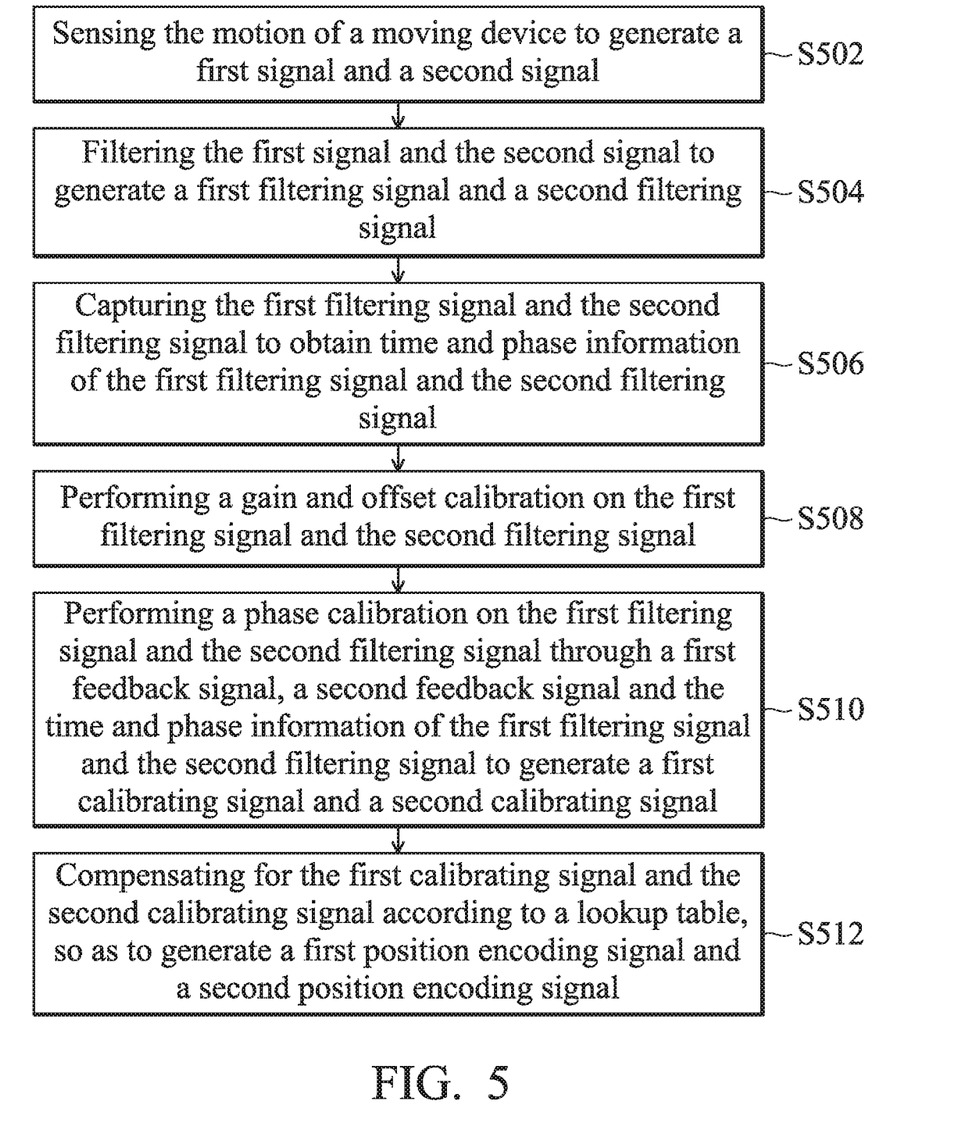
FIG. 5 shows a flowchart of a position encoding method according to an embodiment of the disclosure.

According to the above-mentioned description, the above embodiments may introduce a position encoding method. FIG. 5 shows a flowchart of a position encoding method according to an embodiment of the disclosure.

In step S502, the method involves sensing the motion of a moving device to generate a first signal and a second signal. In step S504, the method involves filtering the first signal and the second signal to generate a first filtering signal and a second filtering signal.

In step S506, the method involves capturing the first filtering signal and the second filtering signal to obtain time and phase information of the first filtering signal and the second filtering signal. In step S508, the method involves performing a gain and offset calibration on the first filtering signal and the second filtering signal.

In step S510, the method involves performing a phase calibration on the first filtering signal and the second filtering signal through a first feedback signal, a second feedback signal and the time and phase information of the first filtering signal and the second filtering signal to generate a first calibrating signal and a second calibrating signal. Wherein the first calibrating signal is designated as the first feedback signal and the second calibrating signal is designated as the second feedback signal. In step S512, the method involves compensating for the first calibrating signal and the second calibrating signal according to a lookup table, so as to generate a first position encoding signal and a second position encoding signal.

Furthermore, the step S506 includes capturing waveforms of initial N cycles of the first filtering signal and the second filtering signal to obtain the time and phase information of the first filtering signal and the second filtering signal, wherein N is a positive integer, and 5≤N≤30.

Figure 6:
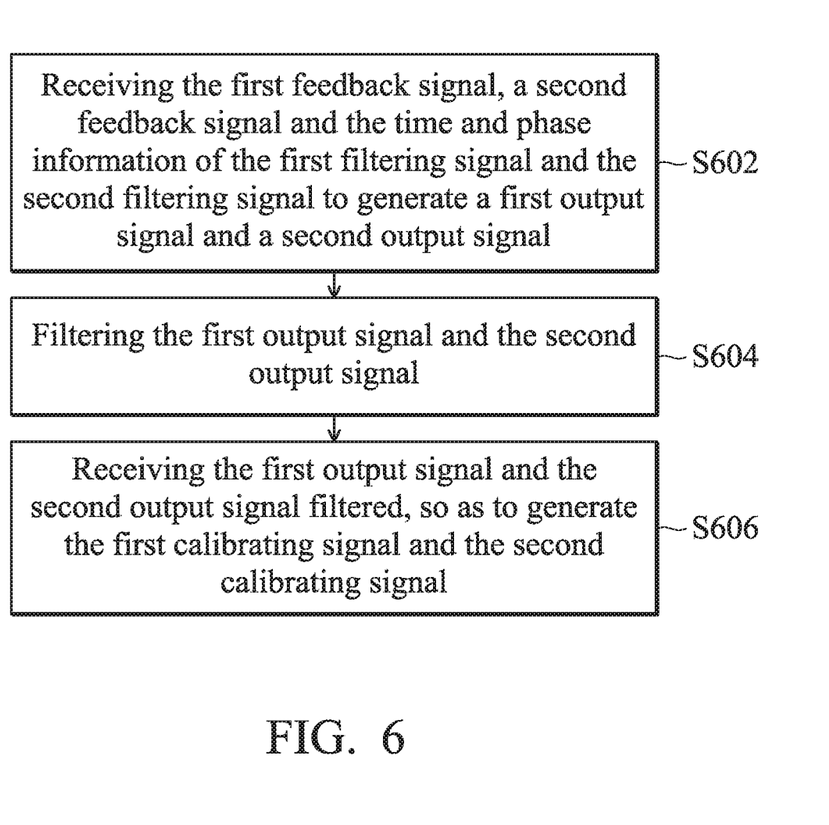
FIG. 6 shows a detailed flowchart of the step S510 in FIG. 5.

FIG. 6 shows a detailed flowchart of the step S510 in FIG. 5. In step S602, the method involves receiving the first feedback signal, a second feedback signal and the time and phase information of the first filtering signal and the second filtering signal to generate a first output signal and a second output signal.

In step S604, the method involves filtering the first output signal and the second output signal. In step S606, the method involves receiving the first output signal and the second output signal filtered, so as to generate the first calibrating signal and the second calibrating signal.

Figure 7:
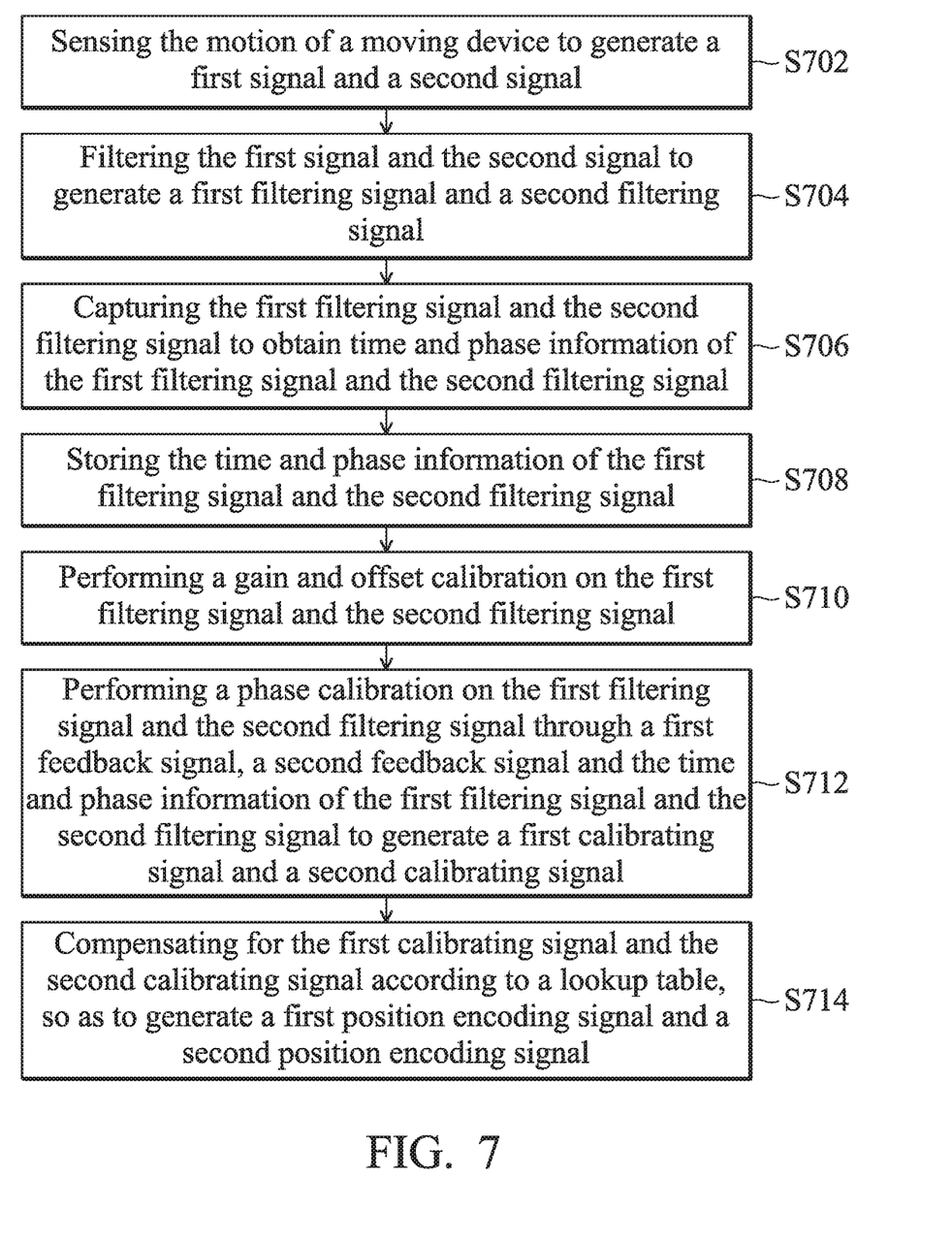
FIG. 7 shows a flowchart of a position encoding method according to another embodiment of the disclosure.

FIG. 7 shows a flowchart of a position encoding method according to another embodiment of the disclosure. In step S702, the method involves sensing the motion of a moving device to generate a first signal and a second signal. In step S704, the method involves filtering the first signal and the second signal to generate a first filtering signal and a second filtering signal.

In step S706, the method involves capturing the first filtering signal and the second filtering signal to obtain time and phase information of the first filtering signal and the second filtering signal. In step S708, the method involves storing the time and phase information of the first filtering signal and the second filtering signal.

In step S710, the method involves performing a gain and offset calibration on the first filtering signal and the second filtering signal. In step S712, the method involves performing a phase calibration on the first filtering signal and the second filtering signal through a first feedback signal, a second feedback signal and the time and phase information of the first filtering signal and the second filtering signal to generate a first calibrating signal and a second calibrating signal. Wherein the first calibrating signal is designated as the first feedback signal and the second calibrating signal is designated as the second feedback signal. In step S714, the method involves compensating for the first calibrating signal and the second calibrating signal according to a lookup table, so as to generate a first position encoding signal and a second position encoding signal.

Furthermore, the step S706 includes capturing waveforms of initial N cycles of the first filtering signal and the second filtering signal to obtain the time and phase information of the first filtering signal and the second filtering signal, wherein N is a positive integer, and 5≤N≤30. In addition, the step S708 includes storing the time and phase information of the first filtering signal and the second filtering signal corresponding to the N cycles.

Figure 8A:
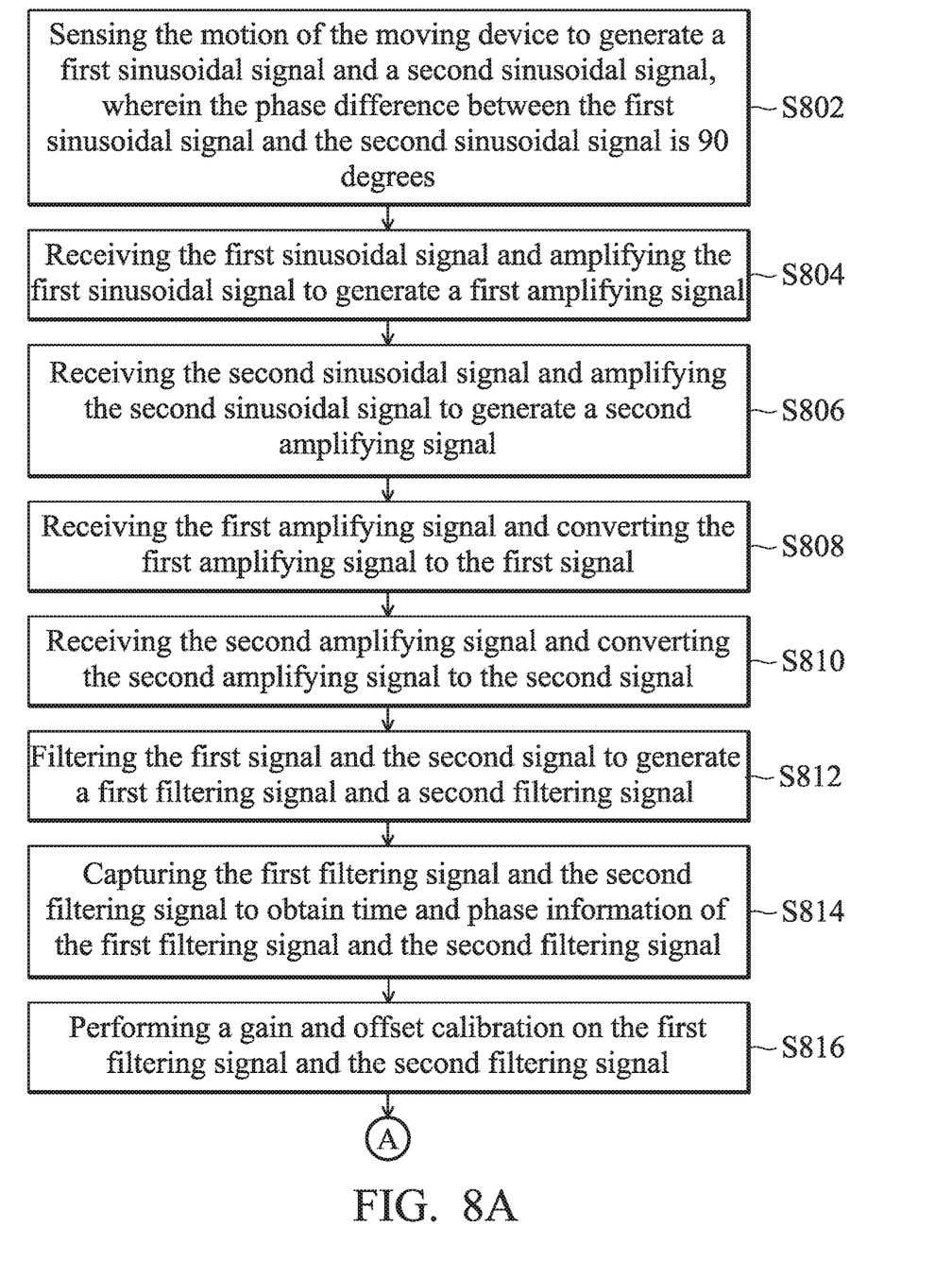
FIGS. 8A and 8B show a flowchart of position encoding method according to another embodiment of the disclosure.
Figure 8B:
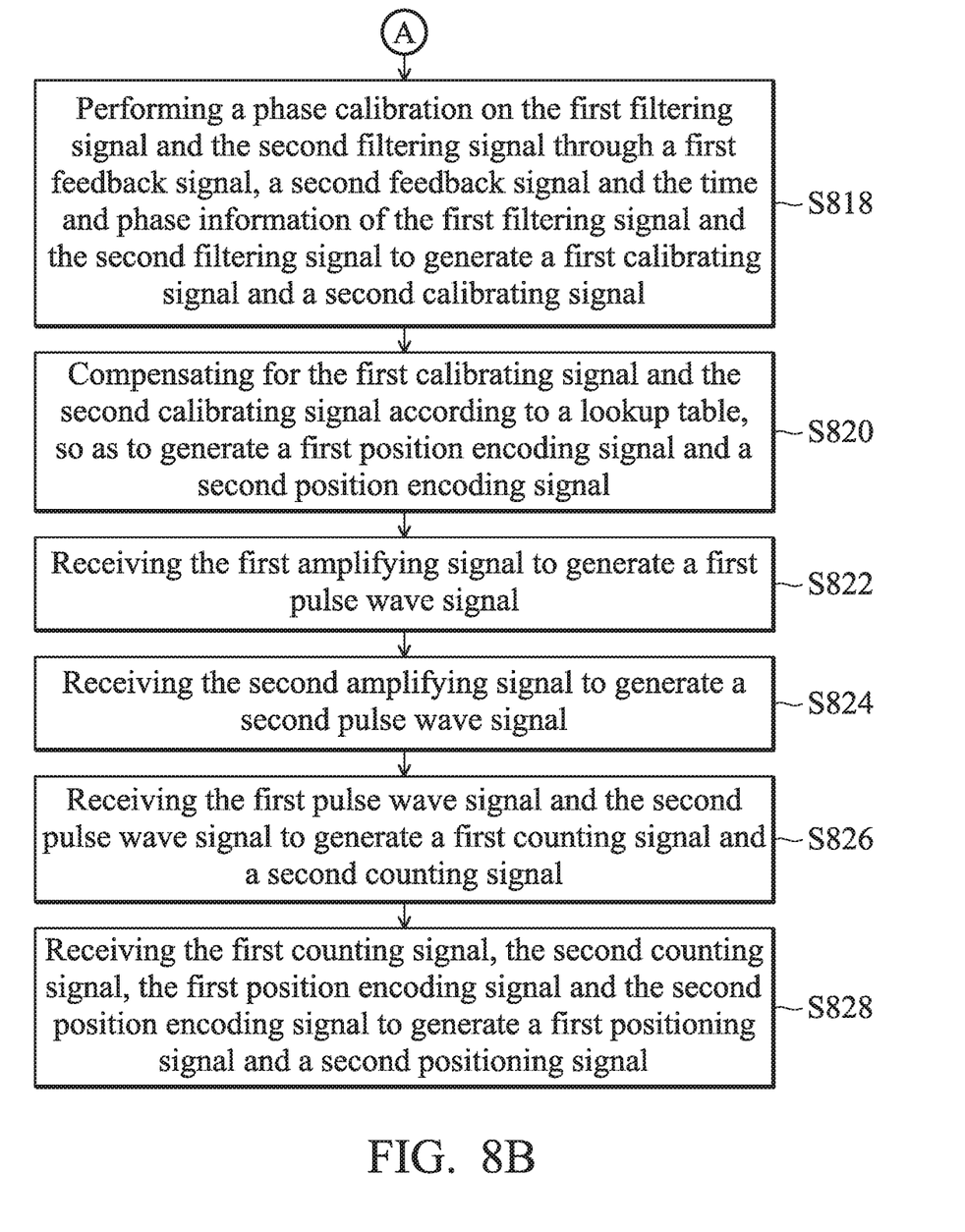

FIGS. 8A and 8B show a flowchart of position encoding method according to another embodiment of the disclosure.

In step S802, the method involves sensing the motion of the moving device to generate a first sinusoidal signal and a second sinusoidal signal, wherein the phase difference between the first sinusoidal signal and the second sinusoidal signal is 90 degrees.

In step S804, the method involves receiving the first sinusoidal signal and amplifying the first sinusoidal signal to generate a first amplifying signal. In step S806, the method involves receiving the second sinusoidal signal and amplifying the second sinusoidal signal to generate a second amplifying signal.

In step S808, the method involves receiving the first amplifying signal and converting the first amplifying signal to the first signal. In step S810, the method involves receiving the second amplifying signal and converting the second amplifying signal to the second signal. In step S812, the method involves filtering the first signal and the second signal to generate a first filtering signal and a second filtering signal.

In step S814, the method involves capturing the first filtering signal and the second filtering signal to obtain time and phase information of the first filtering signal and the second filtering signal. In step S816, the method involves performing a gain and offset calibration on the first filtering signal and the second filtering signal.

In step S818, the method involves performing a phase calibration on the first filtering signal and the second filtering signal through a first feedback signal, a second feedback signal and the time and phase information of the first filtering signal and the second filtering signal to generate a first calibrating signal and a second calibrating signal. Wherein the first calibrating signal is designated as the first feedback signal and the second calibrating signal is designated as the second feedback signal. In step S820, the method involves compensating for the first calibrating signal and the second calibrating signal according to a lookup table, so as to generate a first position encoding signal and a second position encoding signal.

In step S822, the method involves receiving the first amplifying signal to generate a first pulse wave signal. In step S824, the method involves receiving the second amplifying signal to generate a second pulse wave signal. In step S826, the method involves receiving the first pulse wave signal and the second pulse wave signal to generate a first counting signal and a second counting signal. In step S828, the method involves receiving the first counting signal, the second counting signal, the first position encoding signal and the second position encoding signal to generate a first positioning signal and a second positioning signal.

Furthermore, the step S814 includes capturing waveforms of initial N cycles of the first filtering signal and the second filtering signal to obtain the time and phase information of the first filtering signal and the second filtering signal, wherein N is a positive integer, and 5≤N≤30.

In summary, according to the position-encoding device and method, the first signal and the second signal generated by sensing the motion of the moving device are filtered, so as to generate the first filtering signal and the second filtering signal. Then, the first filtering signal and the second filtering signal are captured to obtain the time and phase information of the first filtering signal and the second filtering signal. Afterward, the gain and offset calibration is performed on the first filtering signal and the second filtering signal. Then, the phase calibration is performed on the first filtering signal and the second filtering signal through the first feedback signal, the second feedback signal and the time and phase information of the first filtering signal and the second filtering signal, so as to generate the first calibrating signal and the second calibrating signal. Afterward, the first calibrating signal and the second calibrating signal are compensated according to the lookup table, so as to generate the first position encoding signal and the second position encoding signal. Therefore, the effect of the phase error may be reduced and the accuracy of shifting and positioning is improved.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. A position-encoding device, comprising:
   a sensing device, sensing a motion of a moving device to generate a first signal and a second signal;
   a filtering device, filtering the first signal and the second signal to generate a first filtering signal and a second filtering signal;
   a calibrating device, the calibrating device capturing the first filtering signal and the second filtering signal to obtain time and phase information of the first filtering signal and the second filtering signal, the calibrating device performing a gain and offset calibration on the first filtering signal and the second filtering signal, and the calibrating device performing a phase calibration on the first filtering signal and the second filtering signal through a first feedback signal, a second feedback signal and the time and phase information of the first filtering signal and the second filtering signal to generate a first calibrating signal and a second calibrating signal, wherein the first calibrating signal is designated as the first feedback signal and the second calibrating signal is designated as the second feedback signal; and
   a compensating device, comprising a lookup table and compensating for the first calibrating signal and the second calibrating signal according to the lookup table, so as to generate a first position encoding signal and a second position encoding signal.

2. The position-encoding device as claimed in claim 1, wherein the calibrating device further captures waveforms of initial N cycles of the first filtering signal and the second filtering signal to obtain the time and phase information of the first filtering signal and the second filtering signal, wherein N is a positive integer, and 5≤N≤30.

3. The position-encoding device as claimed in claim 1, wherein the calibrating device comprises:
   a detector, capturing the first filtering signal and the second filtering signal to obtain the time and phase information of the first filtering signal and the second filtering signal;
   a calibrator, performing the gain and offset calibration on the first filtering signal and the second filtering signal; and
   a digital phase-lock loop, performing the phase calibration on the first filtering signal and the second filtering signal through the first feedback signal, the second feedback signal and the time and phase information of the first filtering signal and the second filtering signal to generate the first calibrating signal and the second calibrating signal.

4. The position-encoding device as claimed in claim 3, wherein the phase-lock loop comprises:
   a time-to-digital converter, receiving the first feedback signal, a second feedback signal and the time and phase information of the first filtering signal and the second filtering signal to generate a first output signal and a second output signal;
   a loop filter, coupled to the time-to-digital converter and filtering the first output signal and the second output signal; and
   a digitally controlled oscillator, coupled to the loop filter and time-to-digital converter, receiving the first output signal and the second output signal filtered, so as to generate the first calibrating signal and the second calibrating signal, wherein the first calibrating signal is designated as the first feedback signal and the second calibrating signal is designated as the second feedback signal.

5. The position-encoding device as claimed in claim 3, wherein the phase-lock loop further comprises:
   a storage device, storing the time and phase information of the first filtering signal and the second filtering signal.

6. The position-encoding device as claimed in claim 5, wherein the storage device is integrated into the detector.

7. The position-encoding device as claimed in claim 1, wherein the sensing device comprises:
   a sensor, sensing the motion of the moving device to generate a first sinusoidal signal and a second sinusoidal signal, wherein a phase difference between the first sinusoidal signal and the second sinusoidal signal is 90 degrees;
   a first amplifier, receiving the first sinusoidal signal and amplifying the first sinusoidal signal to generate a first amplifying signal;
   a second amplifier, receiving the second sinusoidal signal and amplifying the second sinusoidal signal to generate a second amplifying signal;
   a first converter, receiving the first amplifying signal and converting the first amplifying signal to the first signal; and
   a second converter, receiving the second amplifying signal and converting the second amplifying signal to the second signal.

8. The position-encoding device as claimed in claim 7, wherein the sensing device further comprises:
   a first comparator, receiving the first amplifying signal to generate a first pulse wave signal; and
   a second comparator, receiving the second amplifying signal to generate a second pulse wave signal.

9. The position-encoding device as claimed in claim 8, further comprising:
   a counter, receiving the first pulse wave signal and the second pulse wave signal to generate a first counting signal and a second counting signal; and
   a combiner, receiving the first counting signal, the second counting signal, the first position encoding signal and the second position encoding signal to generate a first positioning signal and a second positioning signal.

10. A position encoding method, comprising:
    sensing the motion of a moving device to generate a first signal and a second signal;
    filtering the first signal and the second signal to generate a first filtering signal and a second filtering signal;
    capturing the first filtering signal and the second filtering signal to obtain time and phase information of the first filtering signal and the second filtering signal;

performing a gain and offset calibration on the first filtering signal and the second filtering signal;

performing a phase calibration on the first filtering signal and the second filtering signal through a first feedback signal, a second feedback signal and the time and phase information of the first filtering signal and the second filtering signal to generate a first calibrating signal and a second calibrating signal, wherein the first calibrating signal is designated as the first feedback signal and the second calibrating signal is designated as the second feedback signal; and compensating for the first calibrating signal and the second calibrating signal according to a lookup table, so as to generate a first position encoding signal and a second position encoding signal.

11. The position encoding method as claimed in claim 10, wherein the step of capturing the first filtering signal and the second filtering signal to obtain the time and phase information of the first filtering signal and the second filtering signal comprises:

capturing waveforms of initial N cycles of the first filtering signal and the second filtering signal to obtain the time and phase information of the first filtering signal and the second filtering signal, wherein N is a positive integer, and 5≤N≤30.

12. The position encoding method as claimed in claim 10, wherein the step of performing the phase calibration on the first filtering signal and the second filtering signal through the first feedback signal, the second feedback signal and the time and phase information of the first filtering signal and the second filtering signal to generate the first calibrating signal and the second calibrating signal comprises:

receiving the first feedback signal, the second feedback signal and the time and phase information of the first filtering signal and the second filtering signal to generate a first output signal and a second output signal;

filtering the first output signal and the second output signal; and receiving the first output signal and the second output signal filtered, so as to generate the first calibrating signal and the second calibrating signal.

13. The position encoding method as claimed in claim 10, wherein the position encoding method after the step of capturing the first filtering signal and the second filtering signal to obtain the time and phase information of the first filtering signal and the second filtering signal further comprises:

storing the time and phase information of the first filtering signal and the second filtering signal.

14. The position encoding method as claimed in claim 10, wherein the step of sensing the motion of the moving device to generate the first signal and the second signal comprises:

sensing the motion of the moving device to generate a first sinusoidal signal and a second sinusoidal signal, wherein the phase difference between the first sinusoidal signal and the second sinusoidal signal is 90 degrees;

receiving the first sinusoidal signal and amplifying the first sinusoidal signal to generate a first amplifying signal;

receiving the second sinusoidal signal and amplifying the second sinusoidal signal to generate a second amplifying signal;

receiving the first amplifying signal and converting the first amplifying signal to the first signal; and receiving the second amplifying signal and converting the second amplifying signal to the second signal.

15. The position encoding method as claimed in claim 14, further comprising:

receiving the first amplifying signal to generate a first pulse wave signal; and receiving the second amplifying signal to generate a second pulse wave signal.

16. The position encoding method as claimed in claim 14, further comprising:

receiving the first pulse wave signal and the second pulse wave signal to generate a first counting signal and a second counting signal; and receiving the first counting signal, the second counting signal, the first position encoding signal and the second position encoding signal to generate a first positioning signal and a second positioning signal.

* * * * *